United States Patent [15] 3,668,624
Spaulding [45] June 6, 1972

[54] METHOD AND APPARATUS FOR VEHICLE CONTROL AND GUIDANCE

[72] Inventor: David B. Spaulding, Carlisle, Mass.
[73] Assignee: Novatek, Inc., Burlington, Mass.
[22] Filed: Nov. 20, 1969
[21] Appl. No.: 878,407

[52] U.S. Cl. .................................. 340/32, 94/1.5, 180/98
[51] Int. Cl. ........................................................ G08g 1/09
[58] Field of Search .................... 340/32, 34, 38 R, 38 L; 180/98; 94/1 R, 1.5; 85/10 R; 24/201 B

[56] References Cited

UNITED STATES PATENTS

| | | | |
|---|---|---|---|
| 2,493,755 | 1/1950 | Ferrill, Jr. | 180/98 |
| 3,085,646 | 4/1963 | Paufve | 180/98 |
| 3,091,996 | 6/1963 | Macrae | 94/1.5 |
| 3,198,279 | 8/1965 | Quinn | 180/98 |
| 3,493,923 | 2/1970 | Stevens et al. | 94/1 R |
| 3,556,244 | 1/1971 | Gray | 180/98 |
| 3,575,255 | 4/1971 | Wickstrom | 340/32 |
| 1,891,246 | 12/1932 | Shanklin | 85/10 R |
| 2,742,250 | 4/1956 | Cronberger | 85/10 R |
| 3,609,678 | 9/1971 | Fayling | 340/32 |

Primary Examiner—Kathleen H. Claffy
Assistant Examiner—Randall P. Myers
Attorney—Chittick, Pfund, Birch, Samuels & Gauthier

[57] ABSTRACT

A vehicle guidance and control system for providing information concerning the speed and direction of movement of a vehicle along a predetermined path on a roadway. The path is defined by a plurality of spaced, permanently magnetized elements located along the roadway. Vehicle mounted sensors respond to the magnetic fields of the elements and produce electrical signals representing the speed and direction of movement of the vehicle with respect to the path. In one embodiment, the electrical signals are employed as control signals in a closed loop electromechanical guidance system for the vehicle. By varying the pattern of magnetic polarization of the elements, binary information can be transferred from the roadway to the vehicle. With suitable data processing equipment in the vehicle, traffic information, such as, speed limits, directions, accident information, exit directions and the like can be visually presented to the vehicle operator.

9 Claims, 8 Drawing Figures

PATENTED JUN 6 1972  3,668,624

INVENTOR.
DAVID B. SPAULDING
BY

METHOD AND APPARATUS FOR VEHICLE CONTROL AND GUIDANCE

BACKGROUND OF THE INVENTION

This invention relates to vehicle guidance and control systems in general and, more particularly, to a method and apparatus for vehicle guidance and control utilizing discrete, permanently magnetized marker elements.

The recent emphasis on automotive safety has pointed out the need for a relatively simple and inexpensive vehicle guidance and control system which can be installed on existing highways. Automotive safety, itself, is a complicated composite of a number of interrelated variables covering both human and environmental factors. In many instances, the environmental factors, such as, highway design and configuration, must be viewed as unchangeable with respect to automotive safety systems because of the cost considerations involved in restructuring the highway environment. This constraint defines certain parameters of the desired automotive safety system. The system should provide the vehicle operator with information concerning the speed and direction of movement of the vehicle with respect to an established vehicular lane in the highway. At a minimum, a warning signal should be given to the driver whenever he drifts from the desired lane either unintentionally or intentionally, but without signalling for a lane change. Ideally, full automatic control of speed and steering should be available to the vehicle operator. In addition, the system should be able to transmit information to the driver concerning highway conditions, exit information, etc.

Given these performance parameters, the system must also be feasible from a cost standpoint both for new highways and for retrofitting existing highways. Various systems have been proposed in the past using buried cables, metal elements, radioactive markers, inductive loops, and passive reflectors. See for example, U.S. Pat. Nos. 1,981,206; 2,317,400; 2,339,291; 2,750,583; 3,008,532; 3,149,691; 3,169,598; 3,198,279; and 3,229,660. Although these prior art systems provided speed and steering information to the vehicle, they were generally too expensive and complicated to be considered as feasible for a retrofitting installation in the extensive existing highway system.

It is accordingly a general object of the present invention to provide a vehicle guidance and control system that is compatible with existing as well as new highways.

It is a specific object of the invention to provide such a system in which the path defining highway markers can be installed rapidly and inexpensively.

It is another object of the invention to provide a vehicle guidance and control system in which the information provided by the highway markers can be updated without requiring removal of the markers.

It is still another object of the invention to provide a fully automatic vehicle guidance system.

These objects are accomplished in the preferred embodiment of the invention by installing a plurality of spaced, permanently magnetized elements in the roadway. The magnetized elements define a predetermined path or vehicular lane boundary. Vehicle mounted sensors respond to the magnetic fields of the marker elements and produce an electrical signal whenever the vehicle reaches a preselected proximity threshold with respect to the "magnetic fence" lane boundary. The resulting electrical signal can be used for warning or steering control. Preferably, the permanently magnetized elements are in the form of longitudinal pins which are explosively driven into the roadway. This arrangement permits the markers to be installed in new as well as existing highways at a relatively low cost. By varying the pattern of magnetic polarization of the discrete, permanently magnetized elements, binary information can be transferred to the moving vehicle. The system, in its full configuration, provides for data processing in the vehicle to give the driver a visual display in alphanumeric form of the desired highway information.

The objects and features of the invention will best be understood from a detailed description of a preferred embodiment, selected for purposes of illustration, and shown in the accompanying drawings in which.

Figure 1:
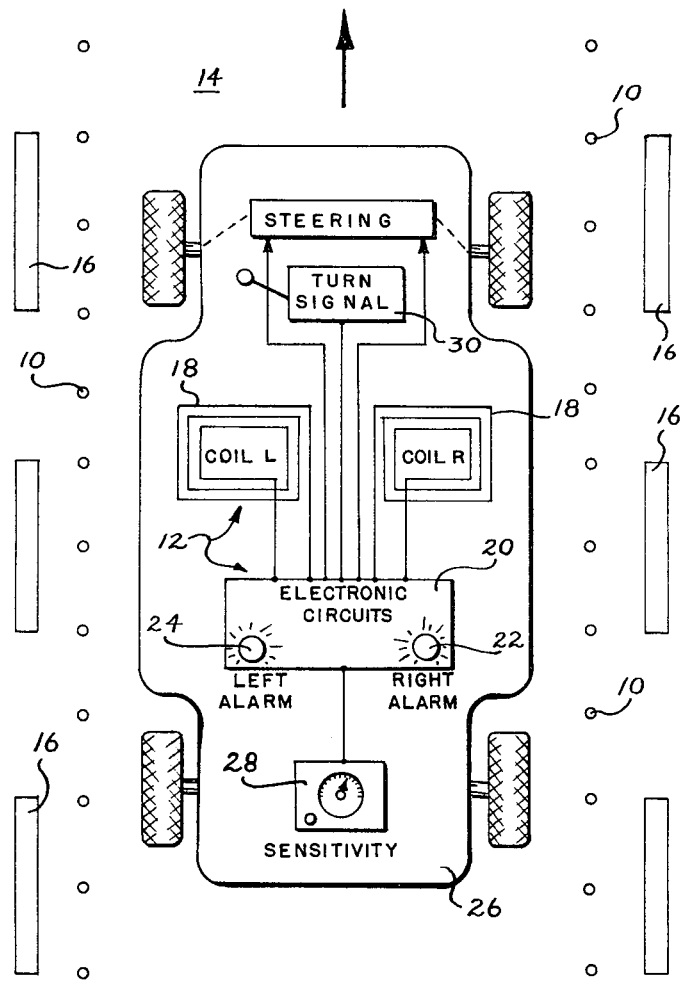
FIG. 1 is a plan view in diagrammatic form of a highway and a vehicle showing the permanently magnetized marker elements and vehicle mounted magnetic field sensors of the present invention.

Turning now to the drawings and particularly to FIG. 1 thereof, there is shown in diagrammatic form a vehicle guidance and control system constructed in accordance with the present invention. Two basic, interactive components make up the system. Permanently magnetized steel pins 10 are one element and electronic detection-processing circuits, indicated generally by the reference numeral 12, are the other. The magnetized pins 10, which are similar in size and shape to commonly used concrete nails, are driven into a highway or roadway 14 in rows along lane boundaries. Typically, the magnetized pins are installed on or near existing painted lane markers 16. The pins, being permanently magnetized, create around themselves a magnetic field that when intercepted by a moving vehicle mounted coil 18, causes a voltage to be induced in the coil. This signal voltage is amplified to a useful level by conventional amplifier circuits 20 and is used to produce an audio-visual indication on left and right alarms 22 and 24, respectively.

Given this simple system, a properly equiped vehicle 26 moving over a row of the permanently magnetized signal pins 10 picks up a series of voltage pulses that are converted into a corresponding series of "beeps" or light flashes. Each beep or tone corresponds to the crossing of a signal pin. Since the range of the pin's magnetic field is sharply limited, no pickup will occur as the vehicle moves away from direct proximity with the pin row. The proximity threshold of the pickup coil 18 to the magnetic pins 10 can be adjusted for the desired distance by means of a sensitivity control 28 which biases the amplifier 20.

It will be appreciated that two parallel rows of the magnetized pins 10 inserted into the roadway 14 along existing painted line lane boundaries 16 and spaced at a reasonable distance apart, such as, for example 5 to 10 feet, can function as a "magnetic fence". In the system shown in FIG. 1, the vehicle's turn signal 30 is connected to the pickup coil signal amplification circuit 20 so that the turn signal 30 will inhibit the lane warning alarms 22 and 24 whenever the turn signal is actuated. The logic function is obtained by inputting the turn signal and the amplified pin signals to an exclusive OR circuit (not shown) which gates the alarm signals 22 and 24. Thus, if a motorist attempts to cross a lane boundary without using the turn signal 30, and thus temporarily disabling the lane warning alarms, he will be immediately and continuously warned that his vehicle is not oriented properly in the lane.

One rather obvious value of this vehicle control arrangement is that daydreaming or physically sleepy drivers will be dependably warned if they begin to drift unconsciously across lane boundaries. When connected with the existing turn signals that are now incorporated in all new vehicles, the control system will strongly encourage disciplined use of the turn signal mechanism. Failure to do so will instantly alert the negligent operator that he is not operating his vehicle properly. The control-alarm system will also provide considerable assistance to the driver during snow or rain storms when the conventional painted lane markers are not visible.

In the preceding brief description of the basic concept of the invention, the term "roadway" has been used in its conventional sense as a way or path for wheeled vehicles, such as, cars, trucks, buses and the like. However, since the present invention is not limited to this particular application, the term "roadway" as used herein in the description and claims shall mean any substantially planar surface upon which a vehicle can travel. In this contest, it can be seen that the basic magnetic pin guidance system can be used on such other diverse areas as airport runways and snow covered land and ice and in industrial warehouses and manufacturing plants for the conveyance of goods along a predetermined path.

Figure 2A:
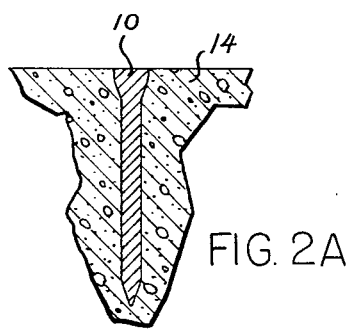
FIG. 2A is a view in cross section showing one of the permanently magnetized marker pins embedded in a concrete highway.
Figure 3A:
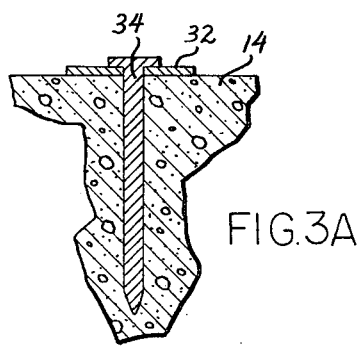
FIG. 3A is a view in cross section of another embodiment of the permanently magnetized marker element showing a planar magnet and a pin fastener embedded in the concrete highway.
Figure 3B:
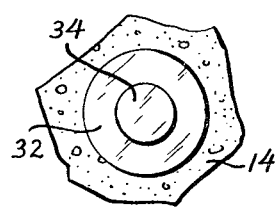
FIG. 3B is a plan view of the marker and fastener shown in FIG. 3A.
Figure 2B:
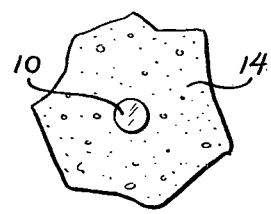
FIG. 2B is a plan view of the marker pin shown in FIG. 2A.

The basic system of a plurality of path defining permanently magnetized elements located along the roadway at spaced intervals, vehicle mounted sensors which respond to the magnetic fields of the pins to produce an electrical signal and some utilization means responsive to the electrical signals can be implemented in a variety of ways. The permanently magnetized element 10, for example, can comprise explosively driven, longitudinal pins having a driving end and a driven end. The configuration of such pins resembles the well-known concrete nails or fasteners. Representative examples of such fasteners are sold by the Winchester-Western Division of Olin Mathieson Chemical Corporation under the trademark "RAMSET" fastening systems. FIGS. 2A and 2B illustrate the use of a magnetized steel pin which has been driven into a concrete highway. Preferably, the driven end of the magnetized pin 10 should be at least flush with the surface of the highway 14. An alternative configuration for the magnetized elements 10 is depicted in FIGS. 3A and 3B. In this embodiment, a planar magnet 32 is surface mounted on the highway by means of an explosive driven fastener 34 which extends through an aperture in the magnet and down into the highway material. It should be understood that the present invention is not limited to the two preceding examples of the magnetized elements and fastening means and that other arrangements can be used, such as, adhesive attachment of planar magnets to the surface of the highway.

Figures 4, 5:
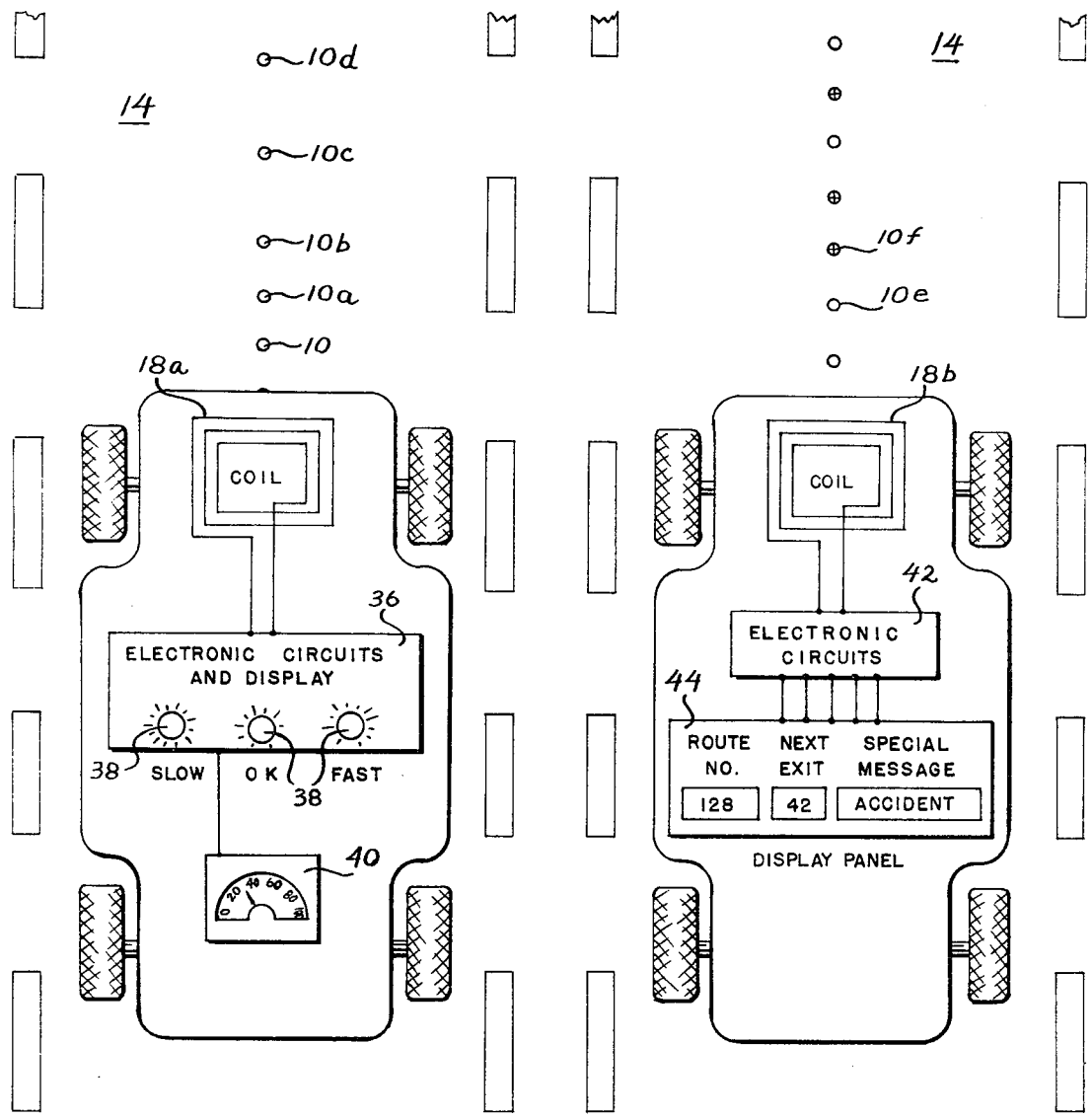
FIG. 4 is a plan view in diagrammatic form of a highway and a vehicle illustrating the arrangement of the magnetized elements for providing speed information.
FIG. 5 is a plan view in diagrammatic form of a highway and a vehicle showing the configuration of the magnetized elements for providing data transfer to the vehicle.
Figure 6:
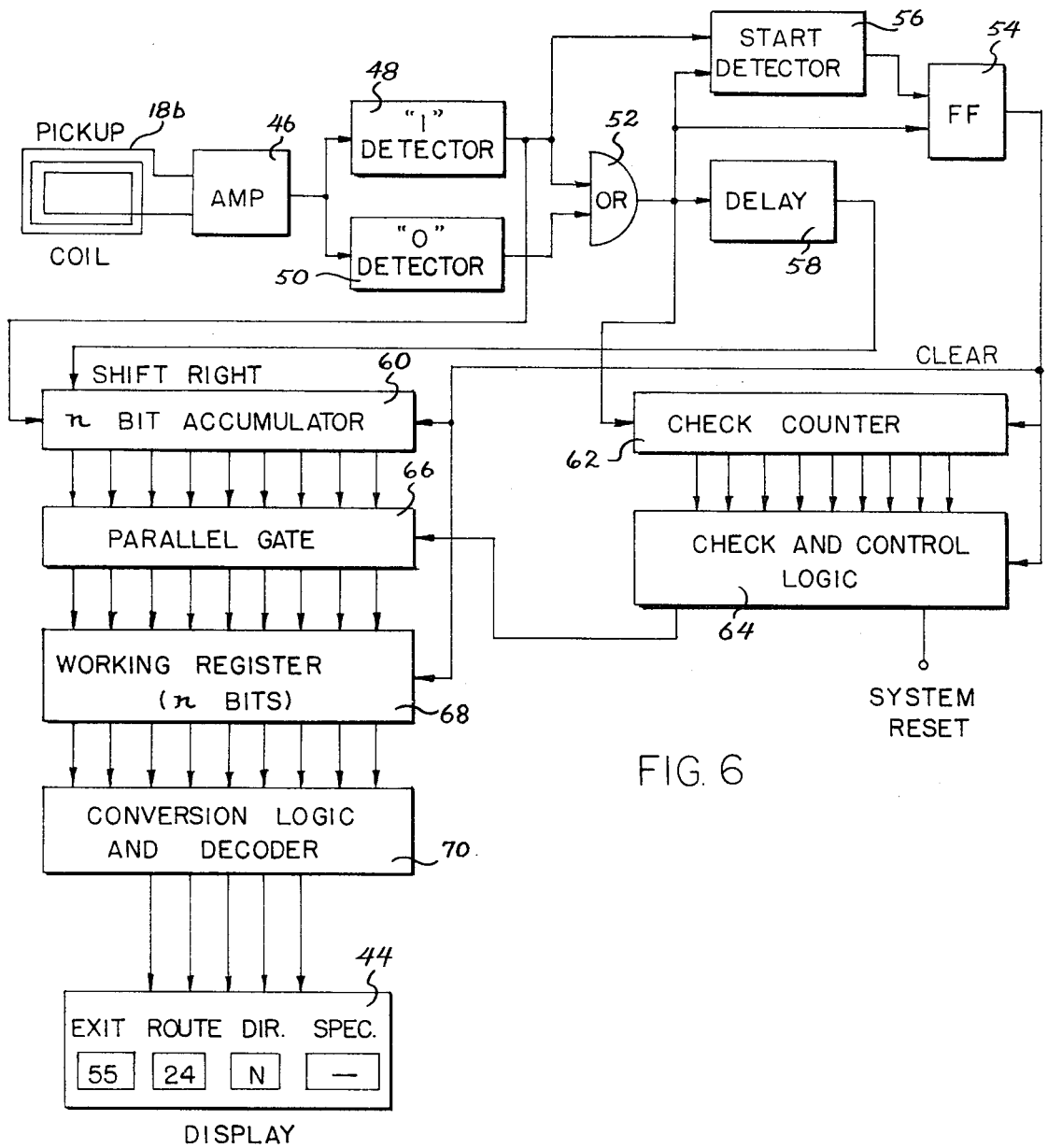
FIG. 6 is a block diagram of the processing circuitry for displaying the information obtained from the pattern of magnetic elements illustrated in FIG. 5.

It will be appreciated at this point in the description of the invention that the benefits and related advantages of the control system described in connection with FIG. 1 can be achieved by a relatively simple electronic package; for instance, something comparable in complexity to a small transistor radio. However, by going to more involved electronics, it is entirely feasible to provide a broad range of other vehicle control functions. These additional operating modes are largely interdependent and can be added to the basic system as desired. FIGS. 4, 5 and 6 illustrate some of these other operating modes.

Looking at FIG. 4, there is shown in plan view in diagrammatic form the configuration of the control system for providing speed control. Speed control is a natural concomitant of the basic system. This type of control is achieve by using a separate control row of magnetized elements 10 in which the pin-to-pin spacing is in direct ratio to the speed limits for the particular highway location. It can be seen in FIG. 4 that the spacing between pins 10a and 10b is less than the spacing between pins 10c and 10d. Changing the distance between the magnetized pins correspondingly changes the pickup frequency at a constant vehicle speed. The frequency of the induced voltage pulses can be directly used to signal the driver of either an underspeed or over-speed operation. Conventional frequency responsive circuits 36 drive the appropriate speed condition signals 38. With this particular pin spacing configuration, it is possible to smoothly taper speed limits from one level to another in a manner determined to optimum traffic flow. It is also possible, of course, to provide a direct readout of vehicle speed on a frequency responsive speedometer 40, if the pin spacing is held constant. A separate row of pins can be used for this purpose or the speed pickup coil 18a can detect the magnetic fields of the lane boundary magnetized pins shown in FIG. 1.

The permanently magnetized elements or pins 10 can also perform other functions. One such specific task is the storage of binary coded information in a manner which allows direct message transfer from the roadway 14 to the vehicle 26. The information transfer function can be readily implemented because the pins can be magnetized in either of two directions and so provide the two state signal needed to store and convey digital messages. Looking at FIG. 5, the information transfer function of the present invention is illustrated in plan view in diagrammatic form. The magnetic pins 10 are arranged in a predetermined pattern of magnetic polarization. The two polarity states are illustrated in FIG. 5 by an open circle pin 10e and a crossed circle pin 10f. Through suitable electronic processing in conventional circuits, indicated in block form in FIG. 5 by the reference numeral 42, the binary information is decoded into alphanumeric information which is presented in visual form on a display pannel 44.

The electronic processing system for the information transfer function of the present invention is illustrated in block diagram form in FIG. 6. The vehicle mounted pickup coil 18b produces a voltage whenever a pickup coil passes one of the magnetized pins 10. The polarity of the induced voltage is a function of the magnetic polarization of the pin. The pin induced signal voltage is amplified by amplifier 46 and applied to the inputs of "1" and "0" Detectors 48 and 50, respectively. An OR gate 52 responds to either the occurrence of a 0 or 1 (eg. a pin passing) and its output is fed to a flip flop (FF) 54, a Start Detector 56, and a Delay circuit 58.

The Start Detector 56 has a second input from the "1" Detector 48. This circuit configuration permits the Start Detector to recognize a predetermined start sequence. The start sequence interpreted by the Start Detector clears the circuit and the readout by setting FF 54 to a clear state which in turn clears all of the registering circuits. In this manner, the data displayed from the last sequence remains on the display 44 until new binary information is transferred to the vehicle from a new set of magnetized pins.

After being cleared, an $n$-bit Accumulator 60 is set to receive the data bits. If the data bit is a 0 no input is necessary since there is a 0 on the input or first bit of the accumulator. The "1" Detector 48 is, however, connected to the input bit of the Accumulator 60 to set it to a 1 when a 1 is detected.

As the 1's or 0's from the pickup coil 18b appear at the input or first bit circuit of the $n$-bit Accumulator 60, they are entered in the accumulator. After a short delay produced by Delay circuit 58, the contents of the Accumulator are shifted one bit circuit to the right leaving the input bit circuit empty or 0 to receive the next 0 or 1. The delay provided by the delay circuit is less than the time required for the vehicle to transit one pin interval.

A Check Counter 62 counts the number of pins and when $n$ pins have been passed (or a preset number of pins), a Check and Control Logic circuit 64 is actuated. The Check and Control Logic circuit energizes Parallel Gates 66 to transfer the count in $n$-bit Accumulator 60 to a Working $n$ bit Register 68. The binary data in register 68 is then decoded by Decoder 70 and displayed in alphanumeric form on the display 44.

With the control capabilities discussed above, it is possible to provide an integrated full guidance system. Referring back to FIG. 1, the lateral warning signals developed by left and right hand pickup coils 18, identified as "Coil L" and "Coil R", respectively, can be used as control signals for a steering servo system, indicated generally by the reference numeral 72. Speed control can be obtained by employing the frequency responsive circuits 36 to provide a control signal for a servo actuated throttle linkage (not shown).

Having described the vehicle guidance and control system, it will be appreciated that the permanently magnetized pins have a number of important advantages. In situations where the equipment is installed outside and subjected to weather conditions of every kind and where the abuse of heavy traffic and even vandalism is to be expected, the question of maintenance is most important. In this respect, the magnetic pin has much to offer:

a. It is passive and required no power to operate;
b. The pins can be quickly inserted and have removal forces of several thousand pounds;
c. When modifications of the patterns of magnetic polarization are required, the pins can be re-magnetized by one man with a single tool if the numbers are moderate;
d. The pins constitute a highly redundant system that does not lose effectiveness if some pins are missing or have become neutralized;
e. Magnetic pins are compatible with other highway instrumentation;
f. The pins can be magnetized either before or after installation;
g. The system can be conveniently implemented in local areas as needed.

These features of the vehicle guidance and control system can be obtained at relatively low cost per mile of highway instrumentation for both new and existing highways.

What I claim is:

1. A system for providing information concerning the movement of a vehicle with respect to a roadway path comprising:
   a plurality of path defining permanently magnetized elements disposed in spaced relation along the roadway, said magnetized elements comprising longitudinal pins each having a driving end and a driven end, said pins being driven into the roadway in a vertical position with the driven end of the pins being at least substantially flush with the surface of the roadway; and,
   vehicle mounted means responsive to the magnetic fields of said magnetized elements for producing an electrical signal each time the vehicle passes one of said elements.

2. The system of claim 1 wherein said pins are explosively driven into the roadway.

3. A method for defining a vehicular boundary in a roadway comprising the steps of:
   a. driving a plurality of permanently magnetizable longitudinal pins into the roadway at spaced intervals along the path of the desired vehicular boundary, said longitudinal pins each having a driving end and a driven end and being driven into the roadway in a vertical position until the driven end is at least substantially flush with the surface of roadway; and,
   b. permanently magnetizing said longitudinal pins.

4. A method for defining a vehicular boundary in a roadway comprising the steps of:
   a. permanently magnetizing a plurality of longitudinal pins, said pins each having a driving end and a driven end; and,
   b. driving a plurality of said magnetized longitudinal pins into the roadway at spaced intervals along the path of the desired vehicular boundary in a vertical position until the driven end of each pin is at least substantially flush with the surface of the roadway.

5. A system for providing information concerning movement of a vehicle with respect to a roadway vehicular lane comprising:
   a plurality of path vehicular lane defining permanently magnetized elements disposed in spaced relation along the roadway with said magnetized elements forming the left and right hand magnetic boundaries of said vehicular lane, and said magnetized elements comprising longitudinal pins each having a driving end and a driven end, said pins being driven into the roadway in a vertical position with the driven end of the pins being at least substantially flush with the surface of the roadway; and,
   vehicle mounted means responsive to the magnetic fields of said magnetized elements for producing an electrical signal representing the direction of movement of the vehicle with respect to the vehicular lane defined by said elements.

6. The vehicle system of claim 5 further characterized by:
   the electrical signal produced by said vehicle mounted means having a signal characteristic which represents the position of said vehicle with respect to the left and right hand magnetic lane boundaries; and,
   means responsive to said electrical signal for steering the vehicle between said lane boundaries.

7. A roadway lane boundary alarm system for moving vehicles comprising:
   a plurality of permanently magnetized elements disposed in linear, spaced relation along the roadway, said elements defining a vehicular lane boundary and comprising longitudinal pins each having a driving end and a driven end, said pins being driven into the roadway in a vertical position with the driven end of the pins being at least substantially flush with the surface of the roadway;
   vehicle mounted means responsive to the magnetic fields of said magnetized elements for producing an electrical signal whenever the vehicle reaches a proximity threshold with respect to said lane boundary; and,
   means responsive to said electrical signal for producing an alarm signal.

8. The vehicle lane boundary alarm system of claim 7 further characterized by the proximity threshold of said vehicle mounted electrical signal producing means being adjustable.

9. A system for providing information concerning the movement of a vehicle with respect to a roadway path comprising:
   a plurality of path defining permanently magnetized, substantially planar elements disposed in spaced relation along the roadway, said planar elements each having a central aperture and being secured to said roadway by means of a driven fastener extending through said aperture and into said roadway; and,
   vehicle mounted means responsive to the magnetic fields of said magnetized elements for producing an electrical signal each time the vehicle passes one of said elements.

* * * * *